US012399261B2

(12) United States Patent
Van Den Broeck

(10) Patent No.: US 12,399,261 B2
(45) Date of Patent: Aug. 26, 2025

(54) METHOD OF OPTICAL DETECTION AND OPTICAL DETECTION APPARATUS

(71) Applicant: Melexis Technologies NV, Tessenderlo (BE)

(72) Inventor: Hans Van Den Broeck, Tessenderlo (BE)

(73) Assignee: Melexis Technologies NV, Tessenderlo (BE)

( * ) Notice: Subject to any disclaimer, the term of this patent is extended or adjusted under 35 U.S.C. 154(b) by 1071 days.

(21) Appl. No.: 17/325,634

(22) Filed: May 20, 2021

(65) Prior Publication Data

US 2021/0364612 A1 Nov. 25, 2021

(30) Foreign Application Priority Data

May 22, 2020 (EP) ..................................... 20176189

(51) Int. Cl.
*G01S 7/4865* (2020.01)
*G01S 17/26* (2020.01)
*G01S 17/36* (2006.01)
*G01S 17/89* (2020.01)

(52) U.S. Cl.
CPC ............ *G01S 7/4865* (2013.01); *G01S 17/26* (2020.01); *G01S 17/36* (2013.01); *G01S 17/89* (2013.01)

(58) Field of Classification Search
None
See application file for complete search history.

(56) References Cited

U.S. PATENT DOCUMENTS

| 9,977,128 B2 | 5/2018 | Oberhammer et al. |
| 2003/0223053 A1* | 12/2003 | Liu .......................... G01S 7/493 356/5.1 |
| 2019/0179017 A1 | 6/2019 | Nagai |
| 2019/0285749 A1 | 9/2019 | Chen |
| 2020/0041628 A1 | 2/2020 | Emadi et al. |
| 2022/0342073 A1* | 10/2022 | Hillard ................... G01S 7/4816 |
| 2022/0350004 A1* | 11/2022 | Emadi ...................... G01S 17/36 |

OTHER PUBLICATIONS

Bashkansky M. et al: "RF phase-coded random-modulation Lidar", Optics Communications, Elsevier, Amsterdam, NL, vol. 231, No. 1-6, Feb. 15, 2004 (Feb. 15, 2004), pp. 93-98.

* cited by examiner

*Primary Examiner* — Eric L Bolda
(74) *Attorney, Agent, or Firm* — Harness, Dickey & Pierce, P.L.C.

(57) ABSTRACT

In a method of optical detection, a carrier signal of a carrier signal period and a code sequence over an exposure time period are generated. Each code (406) of the sequence comprises a plurality of symbols (408, 410, 412, 414, 416) with a timing delay (418, 420, 422, 424) in between. The carrier signal is phase shifted in response to the code sequence (406) depending upon a value of a symbol (408, 410, 412, 414, 416). The modulated carrier signal is applied to a light source, thereby modulating the light which is emitted. An electrical sensor signal is generated in response to received reflected light. A plurality of predetermined phase offset values is applied to the modulated carrier signal, and a plurality of electrical output signals is generated and stored by applying said resulting signal to the electrical sensor signal in accordance with the indirect time of flight measurement technique over the exposure time period. Each symbol (408, 410, 412, 414, 416) has a duration greater than the carrier signal period.

18 Claims, 6 Drawing Sheets

METHOD OF OPTICAL DETECTION AND OPTICAL DETECTION APPARATUS

CROSS-REFERENCE TO RELATED APPLICATIONS

The present application claims priority under 35 U.S.C. § 119 to European Patent Application No. 20176189.7, filed on May 22, 2020, in the European Patent Office, the entire contents of each of which are hereby incorporated by reference.

FIELD

The present invention relates to a method of optical detection of the type that, for example, employs an indirect time of flight measurement technique. The present invention also relates to an optical detection apparatus of the type that, for example, employ an indirect time of flight measurement technique.

BACKGROUND

In so-called time-of-flight sensing systems and other systems, for example night vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by 90°. Using this illumination and sampling approach, a phase angle between illumination and reflection can be determined, and the determined phase angle can be used to determine a distance to the reflecting feature of the scene.

However, the presence of more than one modulated light source in the field of view of an iToF LiDAR system causes interference with respect to the iToF LiDAR system and the distance calculated from the measured phase angle is therefore prone to error. Susceptibility to interference is particularly, but not exclusively, a common problem in relation to the interior of a cockpit of a vehicle, i.e. the interior of an automobile.

A number of different solutions are known to exist in order to try to mitigate the impact of an interfering source of modulated light on an iToF LiDAR module. One technique to counter the effects of interference of multiple iToF LiDAR systems on each other in a common environment, such as the interior of a vehicle cockpit, is for the different iToF LiDAR modules to employ different wavelengths of light. However, the use of a plurality of wavelengths of light in a coordinated fashion relies upon the iToF LiDAR modules supporting such a methodology, which typically requires the modules to share a common manufacturer. Also, this methodology requires the common environment to be well controlled, for example the existence of all light sources in the environment needs to be known and configured so as not to interfere with each other.

Similarly, it is known to provide iToF modules that employ different modulation frequencies in such environments as described above. However, again, the common environment has to be well controlled, and the iToF modules employing different frequencies would typically need to be made by the same manufacturer.

In another technique, where the iToF LiDAR modules do not originate from the same manufacturer, the modulation frequency of one iToF module is "hopped", i.e. continuously changes, during operation of the iToF module, thereby mitigating the effects of interference from other iToF LiDAR modules in the same common environment. However, this statistical interference mitigation measure is of limited benefit in terms of interference rejection.

It is also known to employ a so-called on/off code to a modulation signal and a demodulation signal of an iToF LiDAR module. Whilst such a measure is effective in reducing interference, this methodology has the undesirable effect of reducing significantly the Signal-to-Noise Ratio (SNR) of the iToF LiDAR module employing the measure.

US patent publication no. 2019/285749 relates to modulating LiDAR pulses in order to detect and reject interference. A processor uses the known modulation signal to discriminate between wanted and unwanted received pulses.

In U.S. Pat. No. 9,977,128, an iToF LiDAR system mitigates the effects of interference caused by a secondary light source, by employing a detection technique to detect the secondary interfering source of light. Detection of the secondary source of light enables the light received by an iToF LiDAR module from the secondary light source to be disregarded.

US patent publication no. 2019/179017 discloses an iToF LiDAR system that employs two different modulation frequencies, one of which can be phase-modulated randomly. Such a technique mitigates the effects of interference, but employs a dedicated common-mode elimination circuit to achieve such interference mitigation.

SUMMARY

According to a first aspect of the present invention, there is provided a method of optical detection, the method comprising: emitting continuous wave light; generating a carrier signal having a carrier signal period associated therewith; generating a sequence of codes over an exposure time period, each code of the sequence of codes comprising a plurality of symbols; applying a phase shift to the carrier signal in response to the sequence of codes in order to generate a phase modulated carrier signal; applying the phase modulated carrier signal to the light source in order to modulate the continuous wave light in accordance with the phase modulated carrier signal; emitting the modulated continuous wave light in accordance with an indirect time of flight measurement technique; receiving reflected modulated continuous wave light; generating an electrical sensor signal in response to the reflected modulated continuous wave light; generating a mixing signal by applying a plurality of predetermined phase offset values to the phase modulated carrier signal; generating and storing a plurality of electrical output signals by applying the mixing signal to the electrical sensor signal in accordance with the indirect time of flight measurement technique and in respect of the exposure time period; wherein each symbol has a duration greater than the carrier signal period; phase modulation of the carrier signal comprises shifting a phase of the carrier signal depending upon a value of a symbol of the plurality of symbols; and a timing delay is provided between each symbol of the plurality of symbols.

The timing delay provided between each of the plurality of symbols may be a guard delay configured to minimise a decrease in signal-to-noise ratio of the plurality of electrical output signals caused by transitions at boundaries between symbols of the plurality of symbols.

Each symbol may comprise a first binary value or a second binary value; the first binary value may correspond to a first predetermined phase shift value and the second binary value may correspond to a second phase shift value.

The difference between the first phase shift value and the second phase shift value may be 180 degrees. The first phase shift value may be 180 degrees and the second phase offset value may be 0 degrees or vice versa.

The sequence of codes may comprise repeating occurrences of the plurality of symbols. The repeating occurrences of the plurality of symbols may solely comprise the repeats of the plurality of symbols and the timing delays.

The method may further comprise selecting a duration of the timing delay for subsequent insertion between the each symbol of the plurality of symbols.

The method may further comprise employing an analogue time source to generate the timing delay.

A system time source of an optical ranging apparatus may be employed to generate the timing delay.

The method may further comprise a timing ratio between a duration of the timing delay and a duration of the each symbol; the timing ratio may be between 1:2 and 1:50. The timing ratio may be between about 1:5 and about 1:20.

The each code of the sequence of codes may comprise the plurality of symbols being a pseudorandom binary sequence.

The method may further comprise optimising the timing ratio by modifying the carrier signal period, thereby modifying a duration of the each symbol.

The method may further comprise optimising the timing ratio by modifying a number of symbols per code of the each code of the sequence of codes, thereby modifying a duration of the each symbol.

The method may further comprise optimising the timing ratio by modifying a duration of the exposure time period, thereby modifying a duration of the each symbol.

The method may further comprise: selecting a signal-to-noise ratio in respect of the plurality of electrical output signals and/or an interference rejection in respect of the plurality of electrical output signals; and selecting a duration of the each symbol with respect to multiples of carrier frequency periods to achieve the selected signal-to-noise ratio and/or the interference rejection; and/or selecting a duration of the timing delay to achieve the selected signal-to-noise ratio and/or the interference rejection.

The method may further comprise processing the plurality of electrical output signals in accordance with the indirect time of flight measurement technique in order to calculate a measurement vector and a measured phase angle from the measurement vector.

According to a second aspect of the invention, there is provided a method of determining a range to a feature of a scene, the method comprising: the method of optical detection as set forth above in relation to the first aspect of the invention; and calculating a range using the measured phase angle.

According to a third aspect of the invention, there is provided an optical detection apparatus comprising: a light source configured to emit continuous wave light; a modulation signal generator configured to generate a carrier signal having a carrier signal period associated therewith; a code generator configured to generate a sequence of codes over an exposure time period, each code of the sequence of codes comprising a plurality of symbols; a phase shifter configured to apply a phase shift to the carrier signal in response to the sequence of codes in order to generate a phase modulated carrier signal; a light source driver configured to apply the phase modulated carrier signal to the light source in order to modulate the continuous wave light in accordance with the phase modulated carrier signal; the light source configured to emit the modulated continuous wave light in accordance with an indirect time of flight measurement technique; a detector configured to receive reflected modulated continuous wave light and to generate an electrical sensor signal in response to the reflected modulated continuous wave light; a phase signal generator configured to generate a mixing signal by applying a plurality of predetermined phase offset values to the phase modulated carrier signal; a photonic mixer cell operably coupled to the detector and configured to generate and store a plurality of electrical output signals by applying the mixing signal to the electrical sensor signal in accordance with the indirect time of flight measurement technique and in respect of the exposure time period; wherein each symbol has a duration greater than the carrier signal period; the phase shifter is configured to shift the phase of the carrier signal depending upon the value of a symbol of the plurality of symbols; and the code generator is configured to provide a timing delay between each of the plurality of symbols.

According to a fourth aspect of the invention, there is provided a method of optical detection, the method comprising: a light source emitting continuous wave light; a modulation signal generator generating a carrier signal having a carrier signal period associated therewith; a code generator generating a sequence of codes over an exposure time period, each code of the sequence of codes comprising a plurality of symbols; a phase shifter applying a phase shift to the carrier signal in response to the sequence of codes in order to generate a phase modulated carrier signal; a light source driver receiving the phase modulated carrier signal and applying the phase modulated carrier signal in order to modulate the continuous wave light in accordance with the phase modulated carrier signal; the light source emitting the modulated continuous wave light in accordance with an indirect time of flight measurement technique; a detector receiving reflected modulated continuous wave light and generating an electrical sensor signal in response to the reflected modulated continuous wave light; a phase signal generator generating a mixing signal by applying a plurality of predetermined phase offset values to the phase modulated carrier signal; a photonic mixer cell generating and storing a plurality of electrical output signals by applying the mixing signal to the electrical sensor signal in accordance with the indirect time of flight measurement technique and in respect of the exposure time period; wherein each symbol has a duration greater than the carrier signal period; the phase shifter shifts the phase of the carrier signal depending upon the value of a symbol of the plurality of symbols; and the code generator provides a timing delay between each symbol of the plurality of symbols.

It is thus possible to provide a method and apparatus of detection that offers improved immunity to interference originating from other emitters of light, for example LiDAR modules. The method and apparatus does not sacrifice signal-to-noise ratio performance for the improvement in interference performance.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
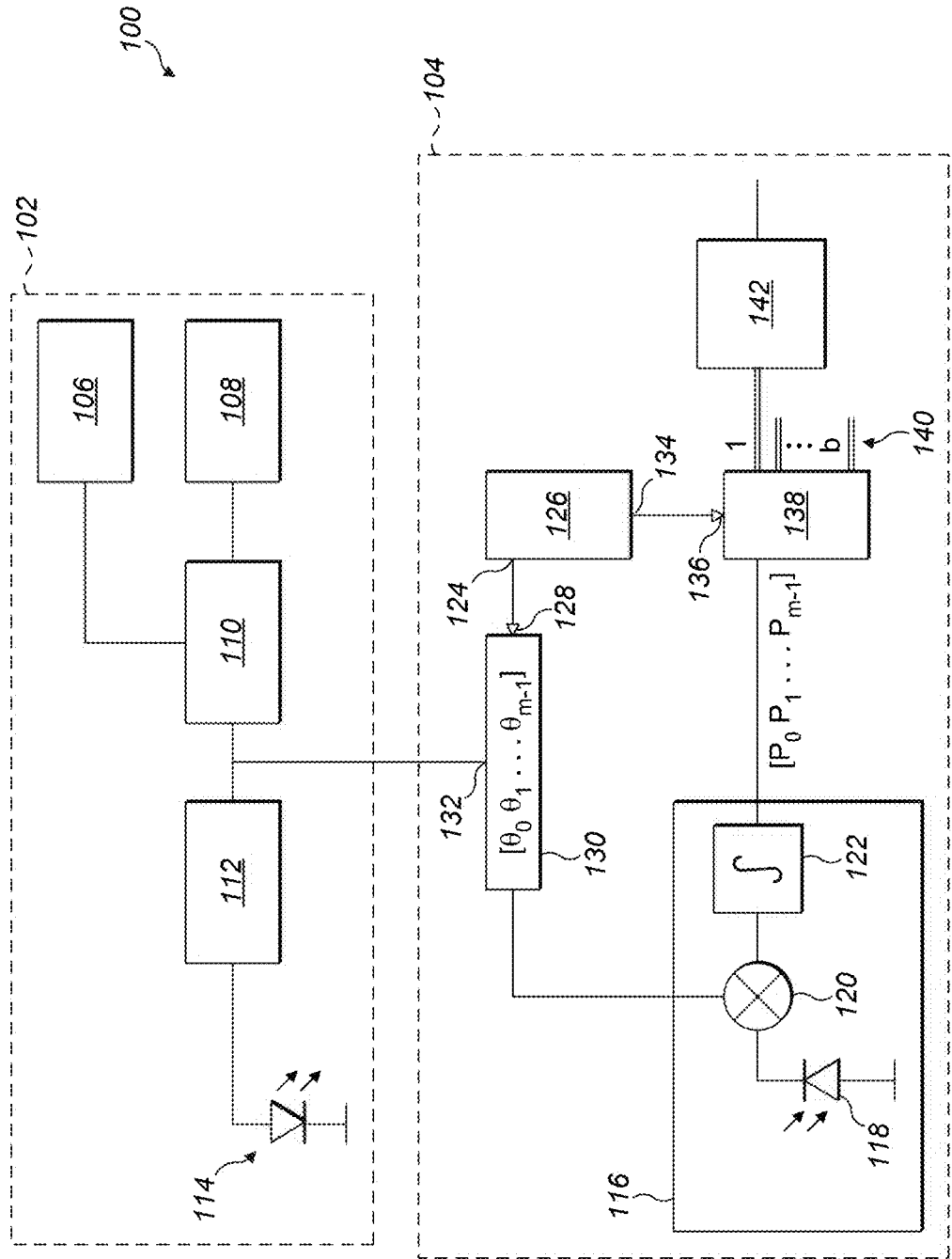
FIG. 1 is a schematic diagram of an indirect time of flight ranging apparatus constituting an embodiment of the invention.

Throughout the following description, identical reference numerals will be used to identify like parts.

Referring to FIG. 1, an indirect time of flight ranging apparatus 100, constituting an optical detection apparatus, comprises an emission module 102 and a detection and ranging module 104. The emission module 102 comprises a carrier signal generator 106 and a code generator 108. The carrier signal generator 106 and the code generator 108 are both coupled to first and second inputs of a phase shifter 110. An output of the phase shifter 110 is coupled to an input of a driver circuit 112. An output of the driver circuit 112 is operably coupled to a source of electromagnetic radiation 114, for example a Laser Diode (LD) or a Light Emitting Diode (LED), which constitute a light source. In this example, the source of electromagnetic radiation 114 emits infrared light constituting a continuous wave optical signal. In this example, the continuous wave optical signal is continuous wave light.

The detection and ranging module 104 of the apparatus 100 comprises an optical receiver photonic mixer pixel device 116, the optical receiver photonic mixer pixel device 116 comprising a photodiode 118 having an anode operably coupled to ground potential and a cathode coupled a first input of a photonic mixer 120, an output of the photonic mixer 120 being coupled to an input of an integrator 122. In this example, a single photonic mixer pixel device 116 is being described for the sake of conciseness and clarity of description. However, the skilled person will appreciate that the detection and ranging module 104 typically comprises a greater number of pixels, for example an array of photonic mixer pixel devices of the kind described above.

A control output 124 of a timing control unit 126 is operably coupled to a control signal input 128 of a phase signal generator 130, an output of the phase signal generator 128 being coupled to a second input of the photonic mixer 120. The output of the phase shifter 110 is also operably coupled to a modulation signal input 132 of the phase signal generator 130. A synchronisation output 134 of the timing control unit 126 is operably coupled to a timing input 136 of a Digital Fourier Transform (DFT) unit 138.

As will be described in further detail later herein, the phase signal generator 130 is configured to manipulate a continuous wave electrical signal provided by the phase shifter 110. In this regard, the phase offset applicable to the continuous wave electrical signal is selectable via the control signal input 128, the phase of the continuous wave electrical signal being selectable from a set of phase offsets: $[\theta_0, \theta_1, \ldots, \theta_{m-1}]$.

An output of the integrator 122 is also coupled to an input of the DFT unit 138. In this respect, phase angle measurements are transferred serially to the DFT unit 138, thereby reducing memory requirements for the detection and ranging module 104. The DFT unit 138 comprises internal buffers (not shown) to support serial transfer of measurements from the integrator 122.

The DFT unit 138 has a plurality of digital in-phase (I)/quadrature (Q) outputs 140. In this example, the DFT unit 138 comprises b pairs of digital I/Q outputs corresponding to different harmonics of measured signals. As the output of the integrator 122 is an accumulated charge and, in this example in the analogue domain, the output of the integrator 122 needs to be converted to the digital domain. This can be achieved, for example, by employing a photon counter as the integrator 122 or providing an analogue-to-digital converter (not shown) before the DFT unit 136.

A first pair of I/Q outputs of the plurality of digital I/Q outputs 140, relating to the first harmonic of the received reflected optical signal, is coupled to a phase angle calculation unit, for example an arctan unit 142. In this example, the DFT unit 138 and the arctan unit 142 constitute a signal processing circuit.

Figure 2:
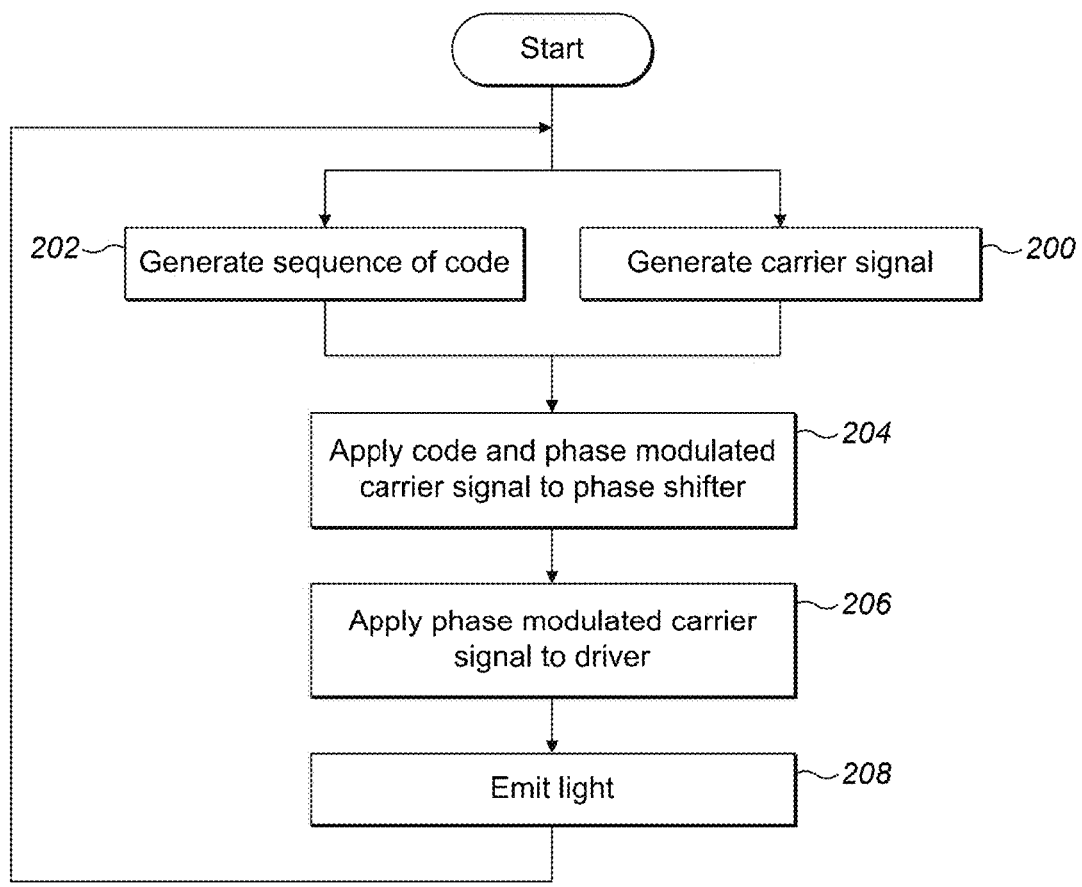
FIG. 2 is a flow diagram of a method of illuminating a scene used by the apparatus of FIG. 1 and constituting another embodiment of the invention.

In operation (FIG. 2), the emission module 102 emits a continuous wave optical signal that illuminates a scene in accordance with an iToF measurement technique, and the detection and ranging module 104 detects light reflected from a feature of the scene, for example an object, in accordance with the iToF measurement technique. Using the principles of the iToF measurement technique, the detection and ranging module 104 also processes an electrical signal generated from the reflected light in order to generate data indicative of a range to the feature of the scene responsible for reflecting incident light that results in the detected reflected light.

Taking the operation of the emission module 102 first, the modulation signal generator 106 generates (Step 200) a carrier signal, for example a continuous wave electrical signal having a square wave form. In this regard, although in the field of optical ranging the carrier signal is often referred to as a modulation signal, the carrier signal nomenclature will be adhered to herein. Substantially simultaneously, the code generator 108 generates (Step 202) a sequence of codes for each period of exposure. In this regard, the period of exposure is a period of time required to measure reflected light for ranging purposes in accordance with the indirect time of flight measurement technique.

In overview, each code word of the sequence of codes comprises a plurality of symbols representing a code. In this example, the code does not change between instances of the code word in the sequence of codes, i.e. the sequence of codes comprises a single code that repeats. However, in other examples, it should be appreciated that the sequence of codes can comprise codes that change between consecutive instances of the codes. In some examples, the codes in the sequence of codes can repeat after a run of a predetermined number of changing codes. In other examples, the content of each codes can constitute a randomly generated code or a pseudorandomly generated code.

Figure 3:
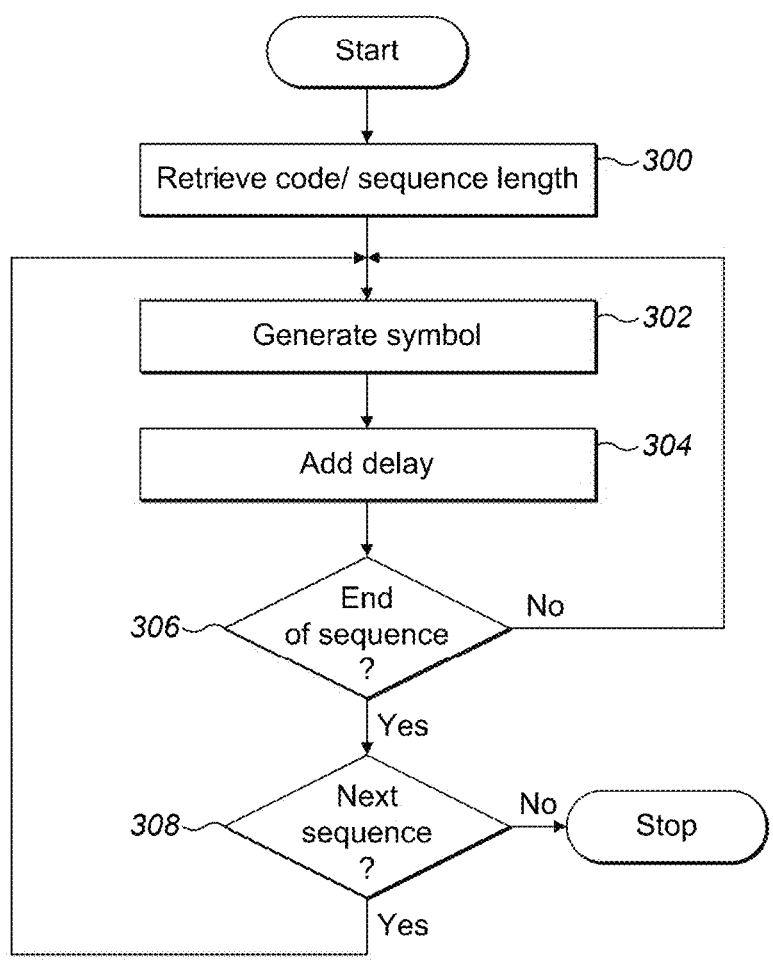
FIG. 3 is a flow diagram of a method of generating a code sequence used by the apparatus of FIG. 1 and the methods of FIGS. 2 and 6 and constituting yet another embodiment of the invention.

Referring to FIG. 3, the sequence of codes is generated in respect of a given period of exposure of the scene as follows. Firstly, a pre-stored code word length can be retrieved to enable generation of the code word that forms the basis of a repeating code word of the sequence of codes. In this regard, the generation of the code word can, as indicated above, comprise pseudorandomly generated binary symbols to yield a code word conforming to the code world length mentioned above. However, in this example, the code word is predetermined and so also pre-stored and retrieved (Step 300) instead of the code word length. The retrieved code word is then analysed and a first symbol of the code word is generated (Step 302) by the code generator 108 and output to the phase shifter 110. The code generator 108 then generates (Step 304) a delay, for example a timing delay, to be inserted between symbols, constituting a guard delay.

In this regard, the provision of the guard delay serves to mitigate signal-to-noise ratio reductions caused by transitions at boundaries between symbols of the plurality of symbols. The duration of the timing delay is selectable, thereby permitting tuning of the signal-to-noise ratio and susceptibility to interference (interference rejection) from external sources of light, for example originating from other LiDAR systems. A system clock (not shown) of the apparatus 100 can be employed as a time base for generating the timing delay. However, in other examples, an analogue circuit can be employed to generate the time delay.

It will be appreciated by the skilled person that a timing ratio exists between the duration of the timing delay and the duration of each symbol. In this regard, the timing ratio can be between about 1:2 and about 1:50, for example between about 1:5 and about 1:20.

After provision of the time delay after the symbol, the code generator 108 then determines (Step 306) whether the end of code word has been reached. If it has not been reached, the code generator 108 selects the next symbol in the code word and generates and outputs the next symbol along with the guard delay (Steps 302 and 304). This process is repeated (Step 302 to 306) until the code generator 108 has determined that the end of the code word has been reached and the last symbol of the code word has been generated and output to the phase shifter 110. Thereafter, the code generator 110 determines whether further repeats of the code word are to be generated (Step 308) or whether no further code words are required, for example if operation of the apparatus 100 is to be placed in a standby mode.

In the event that more code words need to be generated, the code generator 108 continues to generate code words repeatedly (Step 302 to 308) with guard delays in-between consecutive symbols.

Figure 4:
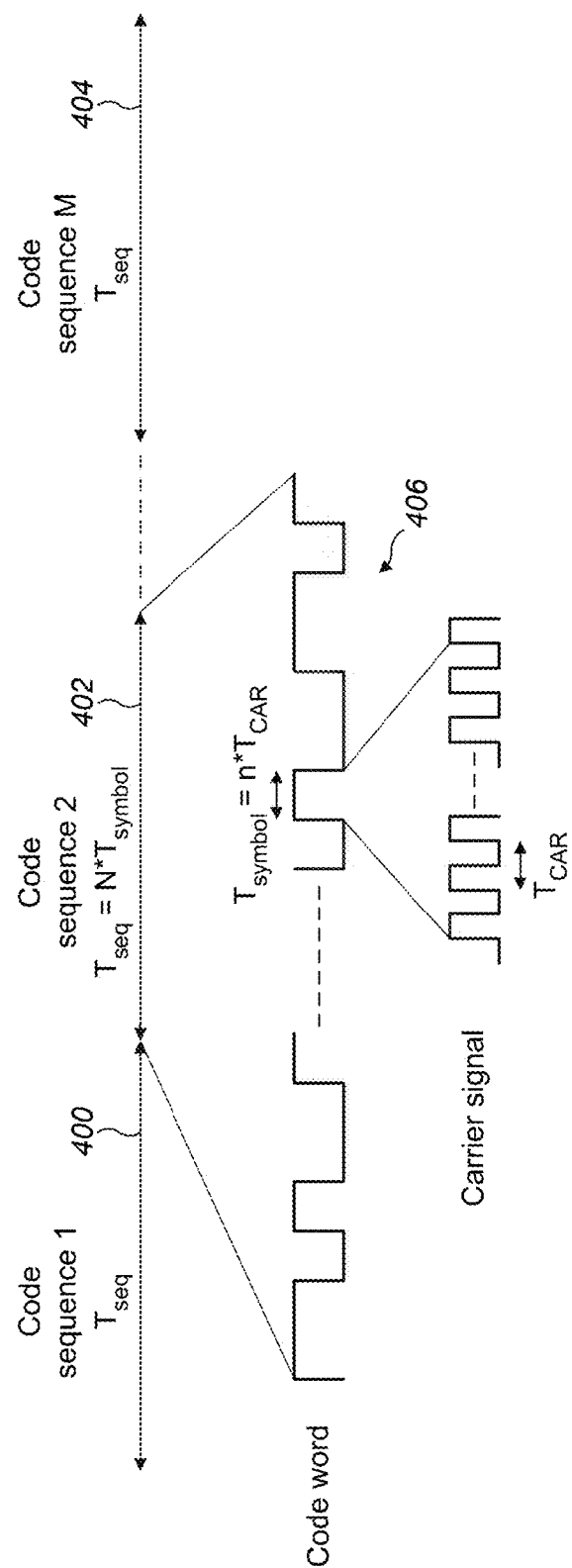
FIG. 4 is a schematic diagram of a structure of a code sequence in relation to the methods of FIGS. 2 and 3.

Turning to FIG. 4, the above described technique results in a sequence of code words being generated, the sequence of code words comprising a plurality of code words, for example a first code word 400, a second code word 402 and an Mth code word 404. Each of a plurality of M code words 400, 402, 404 comprises a plurality of symbols 406. In this example, the plurality of symbols 406 is defined by the pre-stored code word. Additionally, in this example and other examples, each symbol of the plurality of symbols 406 has an associated duration, which is n times greater than a period of the carrier signal.

Figure 5:
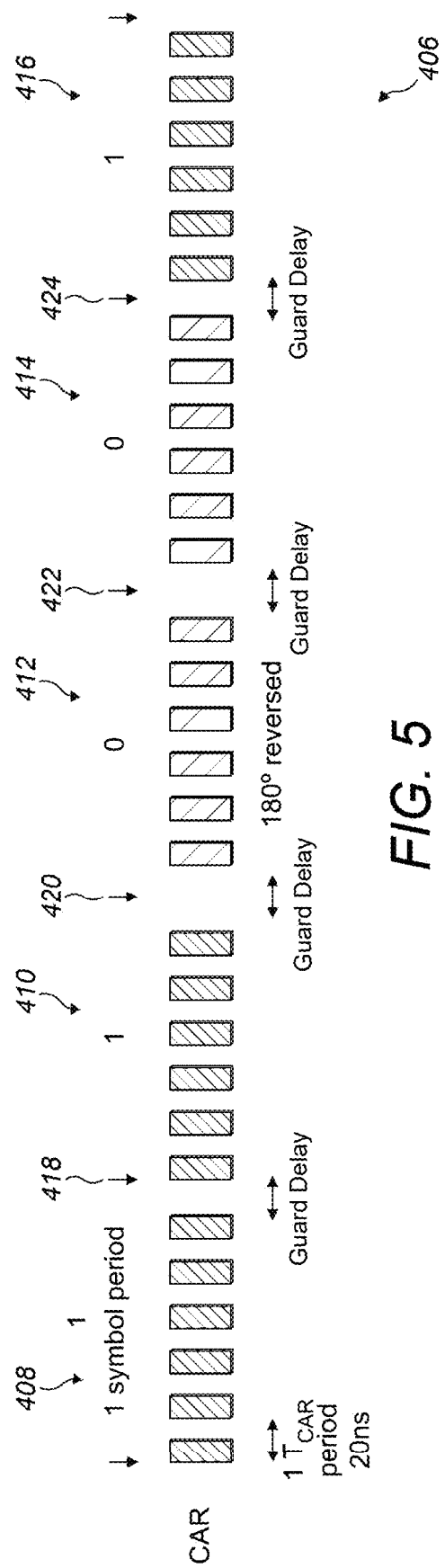
FIG. 5 is a schematic diagram of a distribution of symbols in time of the sequence of FIG. 4 as generated in accordance with the methods of FIGS. 2 and 3.

Referring to FIG. 5, the plurality of symbols 406 comprises a first symbol 408, a second symbol 410, a third symbol 412, a fourth symbol 414 and a fifth symbol 416. This is purely schematic and the plurality of symbols constituting the repeating code word can comprise a greater or fewer number of symbols. In any event, each of the first, second, third, fourth and fifth symbols 408, 410, 412, 414, 416 has a duration lasting n periods of the carrier signal. A first guard delay 418, a second guard delay 420, a third guard delay 422 and a fourth guard delay 424 are respectively disposed between the first and second symbols 408, 410, the second and third symbols 410, 412, the third and fourth symbols 412, 414, and the fourth and fifth symbols 414, 416. The duration of the period of the carrier signal can be adjusted to optimise the number of carrier signal periods elapsing per symbol, for example the first, second, third, fourth and fifth symbols 408, 410, 412, 414, 416. This optimisation serves to modify the ratio between the guard time and the duration of each symbol. In this regard, the degree of dominance of the sum of the guard times within a code word serves to change the overall number of code words in a sequence of code words over an exposure time. As such, the number of code words constituting the sequence of code words influences the signal-to-noise ratio of signals received by the DFT unit 138 (described later herein) and hence the output thereof, and the interference rejection of the apparatus 100, for example optimising to increase the number of code words in the sequence of code words increases the interference rejection, but reduces the signal-to-noise ratio. Conversely, optimising to reduce the number of code words in the sequence of code words serves to reduce the interference rejection, but increases the signal-to-noise ratio. Another optimisation of the ratio between the guard time and the duration of each symbol comprises modifying the number of symbols that a code word comprises. Yet another optimisation of this ratio comprises modifying the duration of the period of exposure. In relation to the above optimisations, the apparatus 100 can be pre-configured to set a signal-to-noise performance parameter and also an interference rejection parameter, taking into account that a modification to improve one of the signal-to-noise ratio performance parameter and the interference rejection parameter results in a degradation to the other performance parameter. Once set, one or more of the above optimisations can be employed to achieve the desired performance parameter settings, for example the duration of a symbol in terms of the number of carrier signal periods and/or the duration of each guard delay. In other embodiments, the signal-to-noise and interference rejection performance parameters can be dynamically set in response to environmental factors encountered during operation and adjusted on-the-fly by the apparatus 100, for example by the signal processing circuit of the apparatus 100.

Referring back to FIG. 2, the carrier signal and the sequence of codes are received by the phase shifter 110 and applied thereby (Step 204). In this regard, the phase shifter 110 modifies the phase (Step 206) of the carrier signal in response to the state, or value, of each symbol of a code word in the sequence of codes. For example, a logic or binary 1 in the code word represents shifting the phase of the carrier signal by 0°, whereas a logic or binary 0 in the code word represents shifting the phase of the carrier signal by 180°. Of course, in other examples, the logic 0 and logic 1 states represented by the symbols of the code word can represent the application of the opposite to those phase shift values set forth above. It can therefore be seen that the symbol can represent either a first value or a second value, the first value corresponding to a first phase shift value and the second value corresponding to a second phase shift value. In this example, the difference between the first predetermined phase shift value and the second predetermined phase shift value is 180°.

The phase modulated carrier signal is then provided to the phase signal generator 130 and the driver circuit 112. The application of the phase modulated carrier signal by the phase signal generator 130 will be described later herein in connection with the operation of the detection and ranging module 104. However, in relation to the driver circuit 112, the driver circuit 112 conditions and amplifies the received phase modulated carrier signal and drives the light source 114 in order to emit the continuous wave optical signal in accordance with the phase modulated carrier signal, thereby generating phase modulated continuous wave light.

After emission, a feature of the scene, for example, reflects the emitted optical signal. The detection and ranging module 104 is responsible for detecting this reflected light and generating data indicative of a range from the detection and ranging module 104 to the feature. In this regard, some of the modulated continuous wave light is reflected by the feature and received by the photodetector 118, which generates an electrical sensor signal in response thereto.

Figure 6:
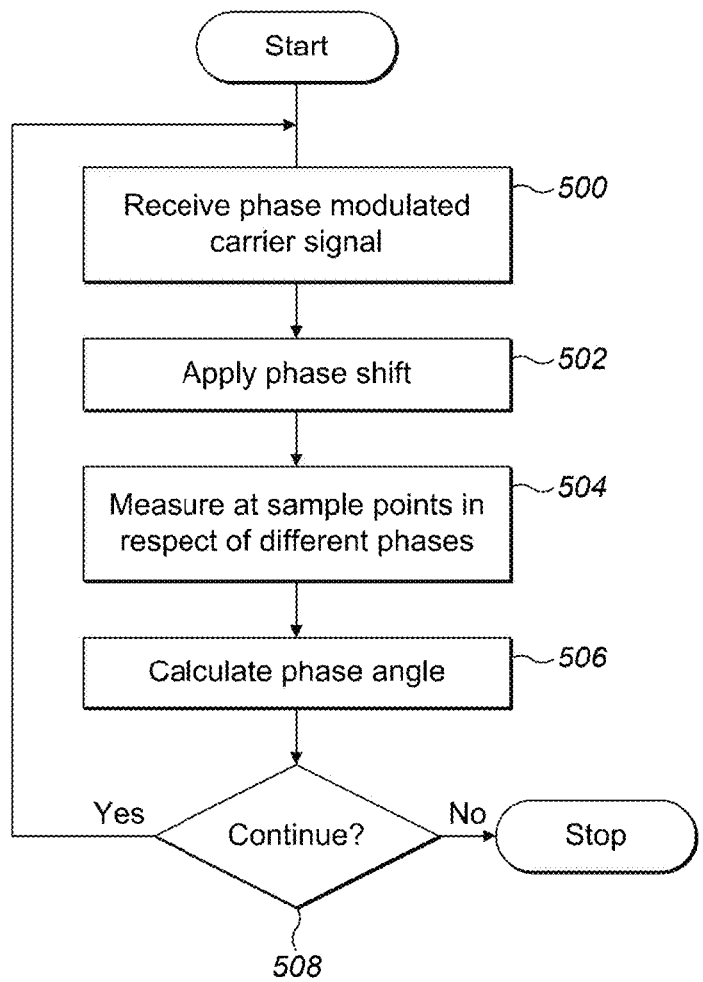
FIG. 6 is a flow diagram of a method of demodulating a received optical signal used by the apparatus of FIG. 1 and constituting a further embodiment of the invention.

In this regard, and referring to FIG. 6, the phase signal generator 130 receives (Step 500) the phase modulated carrier signal generated by the phase shifter 110. The phase modulated carrier signal is a continuous wave electrical signal. The timing control unit 126 controls cycling through and application of the set of phase offsets to the phase modulated carrier signal (Step 502) relative to the phase modulated continuous wave optical signal. In this respect, the phase signal generator 130 outputs the phase modulated carrier signal after having the above-mentioned phase shift from the set of phase offsets applied to the phase modulated carrier signal. A synchronisation signal is also applied by the synchronisation output 134 to the DFT unit 138 to ensure properly timed processing of the output of the integrator 122.

The electrical signal generated by the phase signal generator 130 is applied to the photonic mixer 116 along with the electrical sensor signal from the photodetector 118, the phase offset of the electrical signal (the phase modulated carrier signal) being cycled through the set of phase offsets mentioned above in accordance with the iToF measurement technique. The integrator 122 stores accumulated charges generated by the photonic mixer 116 in respect of each period of application of each phase offset, which constitute a measurement subframe. In this regard, the integrator 122 resets for each measurement subframe, which corresponds to the application of a different phase offset value. Digital representations of the charges stored in the integrator 122 in respect of each phase offset of the set of phase offsets are measured (Step 504), constituting electrical output signals, and received by the DFT unit 138 in series and converted to a pair of I/Q outputs constituting an I/Q vector, V, representing the complex valued analogue electrical measurements in respect of the fundamental frequency. In this respect, the integrator 122 provides a plurality of phase-separated amplitude measurement outputs in series representing respective accumulated charge levels for applied phase offset values in respect of the photonic mixer pixel device 116. The DFT unit 138 calculates, for each subframe, intermediate I and Q values for phase-separated amplitude measurements respectively received in series, which are accumulated over a frame cycle to generate final I and Q value results. Operation of such an arrangement comprises vectors being calculated iteratively using the DFT unit 138 in respect of each incoming phase angle measurement.

The DFT unit 138 can also generate other I/Q vectors in respect of harmonics of the charges measured by the integrator 122. After the electrical measurement signals are converted to the frequency domain, the I- and Q-values for the fundamental frequency are provided by the DFT unit 138 at the outputs thereof. In this example, the synchronisation signal ensures that the fundamental frequency I/Q outputs of a current measurement frame of the DFT unit 138 are synchronously received by the arctan unit 142. The arctan unit 142 then, in accordance with the indirect time of flight measurement technique, calculates (Step 506) an angle of the vector, V, constituting an extracted (measured) calculated phase angle, $\varphi_{meas}$, in the complex plane from the fundamental frequency I and Q values. The calculated phase angle can then be used to calculate a range to the source of the reflection of the emitted light.

The above steps (Steps 500 to 506) are repeated (Step 508) until calculation of measured angles is no longer required.

The skilled person should appreciate that the above-described implementations are merely examples of the various implementations that are conceivable within the scope of the appended claims. Indeed, it should be appreciated that, for example, the technique described above employing 0° and 180° phase shifts are exemplary only and other phase shift values can be ascribed to the logic levels of the symbols of the code words, for example 90° and 270°, respectively. However, the above examples employ the 0° and 180° phase shifts owing to these values resulting in the autocorrelation of the code word being narrower than when using other phase shift values.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

What is claimed is:

1. A method of optical detection, the method comprising:
   emitting continuous wave light;
   generating a carrier signal having a carrier signal period associated therewith;

generating a sequence of codes over an exposure time period, each code of the sequence of codes comprising a plurality of symbols;
applying a phase shift to the carrier signal in response to the sequence of codes in order to generate a phase modulated carrier signal;
applying the phase modulated carrier signal to a light source in order to modulate the continuous wave light in accordance with the phase modulated carrier signal;
emitting the modulated continuous wave light in accordance with an indirect time of flight measurement technique;
receiving reflected modulated continuous wave light;
generating an electrical sensor signal in response to the reflected modulated continuous wave light;
generating a mixing signal by applying a plurality of predetermined phase offset values to the phase modulated carrier signal; and
generating and storing a plurality of electrical output signals by applying the mixing signal to the electrical sensor signal in accordance with the indirect time of flight measurement technique and in respect of the exposure time period, wherein
each symbol has a duration greater than the carrier signal period;
phase modulation of the carrier signal comprises shifting a phase of the carrier signal depending upon a value of a symbol of the plurality of symbols; and
a timing delay is provided between each symbol of the plurality of symbols, and
wherein the method further includes optimising a timing ratio by modifying the carrier signal period, thereby modifying the duration of the each symbol, the timing ratio being between a duration of the timing delay and the duration of the each symbol and is between 1:2 and 1:50.

2. The method according to claim 1, wherein the timing delay provided between each of the plurality of symbols is a guard delay configured to minimise a decrease in signal-to-noise ratio of the plurality of electrical output signals caused by transitions at boundaries between symbols of the plurality of symbols.

3. The method according to claim 1, wherein each symbol comprises a first binary value or a second binary value, the first binary value corresponding to a first wined phase shift value and the second binary value corresponding to a second phase shift value.

4. The method according to claim 1, wherein the sequence of codes comprises repeating occurrences of the plurality of symbols.

5. The method according to claim 1, further comprising:
selecting the duration of the timing delay for subsequent insertion between the each symbol of the plurality of symbols.

6. The method according to claim 1, further comprising:
employing an analogue time source to generate the timing delay.

7. The method according to claim 1, further comprising:
optimising the timing ratio by modifying a number of symbols per code of the each code of the sequence of codes, thereby modifying the duration of the each symbol.

8. The method according to claim 1, further comprising:
optimising the timing ratio by modifying a duration of the exposure time period, thereby modifying the duration of the each symbol.

9. The method according to claim 1, further comprising:
selecting a signal-to-noise ratio in respect of the plurality of electrical output signals and/or an interference rejection in respect of the plurality of electrical output signals; and
selecting the duration of the each symbol with respect to multiples of carrier frequency periods to achieve the selected signal-to-noise ratio and/or the interference rejection; and/or
selecting the duration of the timing delay to achieve the selected signal-to-noise ratio and/or the interference rejection.

10. The method according to claim 1, further comprising:
processing the plurality of electrical output signals in accordance with the indirect time of flight measurement technique in order to calculate a measurement vector and a measured phase angle from the measurement vector.

11. The method of determining a range to a feature of a scene, the method comprising:
the method of optical detection according to claim 10; and
calculating a range using the measured phase angle.

12. The method according to claim 3, wherein a difference between the first phase shift value and the second phase shift value is 180 degrees.

13. The method according to claim 12, wherein the first phase shift value is 180 degrees and the second phase shift value is 0 degrees or vice versa.

14. The method according to claim 4, wherein the repeating occurrences of the plurality of symbols solely comprises repeats of the plurality of symbols and the timing delays.

15. The method according to claim 1, wherein a system time source of an optical ranging apparatus is employed to generate the timing delay.

16. The method according to claim 1, wherein the timing ratio is between about 1:5 and about 1:20.

17. The method according to claim 1, wherein the each code of the sequence of codes comprises the plurality of symbols being a pseudorandom binary sequence.

18. An optical detection apparatus comprising:
a light source configured to emit continuous wave light;
a modulation signal generator configured to generate a carrier signal having a carrier signal period associated therewith;
a code generator configured to generate a sequence of codes over an exposure time period, each code of the sequence of codes comprising a plurality of symbols;
a phase shifter configured to apply a phase shift to the carrier signal in response to the sequence of codes in order to generate a phase modulated carrier signal;
a light source driver configured to apply the phase modulated carrier signal to the light source in order to modulate the continuous wave light in accordance with the phase modulated carrier signal;
the light source configured to emit the modulated continuous wave light in accordance with an indirect time of flight measurement technique;
a detector configured to receive reflected modulated continuous wave light and to generate an electrical sensor signal in response to the reflected modulated continuous wave light;
a phase signal generator configured to generate a mixing signal by applying a plurality of predetermined phase offset values to the phase modulated carrier signal;
a photonic mixer cell operably coupled to the detector and configured to generate and store a plurality of electrical output signals by applying the mixing signal to the electrical sensor signal in accordance with the indirect time of flight measurement technique and in respect of the exposure time period, wherein each symbol has a duration greater than the carrier signal period;

the phase shifter is configured to shift the phase of the carrier signal depending upon the value of a symbol of the plurality of symbols;

the code generator is configured to provide a timing delay between each of the plurality of symbols; and the modulation signal generator is configured to optimise a timing ratio by modifying the carrier signal period, thereby modifying the duration of the each symbol, the timing ratio being between a duration of the timing delay and the duration of the each symbol and is between 1:2 and 1:50.

* * * * *